(No Model.)
R. S. McPHAIL.
TROLLEY WHEEL.
No. 591,489. Patented Oct. 12, 1897.
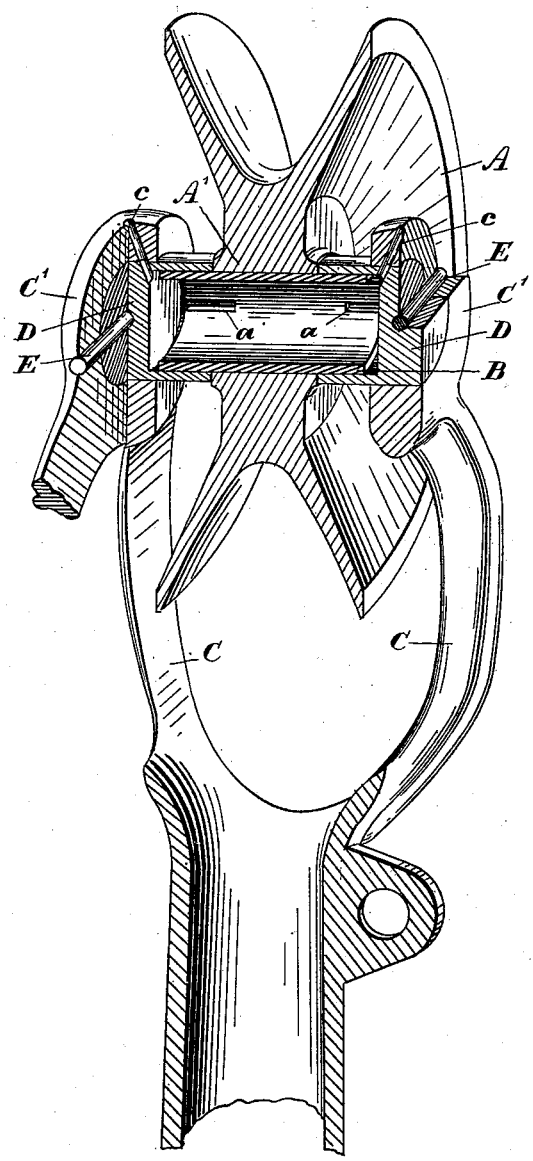
Witnesses.
E. R. Case
H. Dennison
Inventor.
R. S. McPhail
by Fetherstonhaugh & Co.
attys.

UNITED STATES PATENT OFFICE.

RICHARD STEWART McPHAIL, OF TORONTO, CANADA.

TROLLEY-WHEEL.

SPECIFICATION forming part of Letters Patent No. 591,489, dated October 12, 1897.

Application filed May 18, 1896. Serial No. 591,983. (No model.)

*To all whom it may concern:*

Be it known that I, RICHARD STEWART MCPHAIL, gentleman, residing at the city of Toronto, in the county of York, in the Province of Ontario, Canada, have invented certain new and useful Improvements in Trolley-Wheels, of which the following is a specification.

My invention relates to improvements in trolley-wheels; and the object of the invention is to design a simple form of bearing for the wheel which will last a great length of time; and it consists, essentially, of providing a hollow axle for the bearing which fits into cylindrical cups secured in the forked end of the trolley-arm, the device being otherwise constructed as hereinafter more particularly explained.

The drawing represents a sectional perspective view of a trolley-wheel and forked end of the trolley-arm.

A is the trolley-wheel, the hub A' of which has inserted into it the hollow axle B, which is sweated or otherwise secured in place, so that an equal portion of such axle extends out each side of the hub A'.

C are the two members of the forked end of the trolley-pole, which are provided with the outer bearing C'.

D are cylindrical cups which are secured in the bearings C' by the pins E, which extend through such bearings and the thick outer ends of the cylindrical cups, and thereby secure such cups from rotation. The outer ends of the cylindrical cups D are flush with the face of the bearings C'.

*c* are oil-holes which lead through the bearings C' and ends of the cylindrical cups D and are designed to supply oil into the interior of the axle, which is preferably filled with oil.

*a* are notches made in the ends of the hollow axle B. There may be several of these notches *a* around the periphery.

It will be seen as the wheel rotates the hollow axle B will rotate with it, and the oil will pass through the notches *a* and thereby serve to keep the exterior portion of the axle, which revolves in the cylindrical cups, perfectly lubricated, thereby materially reducing the friction and lessening the wear upon the hollow axle.

Heretofore axles have been constructed solid and have worn through very quickly, but by my invention with the hollow axle and cylindrical cups forming a well for the oil such axle is kept thoroughly lubricated, and being made preferably of steel will last a considerable length of time, and a great economy is thereby effected.

What I claim as my invention is—

1. In combination the trolley-pole having forked ends, cups immovably secured in said ends, a hollow axle journaled in said cups, oil-conduits running obliquely through said ends and cups, and discharging directly into said hollow axle, the filling end of said conduit being located in the outer face of the forked ends, said axle having distributing oil-conveying notches in the body thereof leading from its interior to its exterior, said notches extending full width of the bearing-surfaces of said cups, substantially as described.

2. In combination the trolley-pole having the forked end, cups immovably secured in said forks, a trolley-wheel, a hollow axle immovably secured within the hub of the wheel and extending outwardly beyond the faces of the hub at each end and journaled in said cups, and oil-distributing notches located outside the faces of the hub in the axle and designed to lubricate the outer peripheral surfaces of the axle which rotates within the cups.

RICHARD STEWART McPHAIL.

Witnesses:
B. BYD,
H. DENNISON.